(12) United States Patent
Koo (10) Patent No.: US 11,052,859 B2
(45) Date of Patent: Jul. 6, 2021

(54) ROOF AIRBAG APPARATUS

(71) Applicant: HYUNDAI MOBIS CO., LTD., Seoul (KR)

(72) Inventor: You Hoe Koo, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 139 days.

(21) Appl. No.: 16/667,029

(22) Filed: Oct. 29, 2019

(65) Prior Publication Data

US 2020/0139918 A1    May 7, 2020

(30) Foreign Application Priority Data

Nov. 7, 2018    (KR) ........................ 10-2018-0135691

(51) Int. Cl.
| | |
|---|---|
| *B60R 21/213* | (2011.01) |
| *B60R 21/2338* | (2011.01) |
| *B60R 21/231* | (2011.01) |
| *B60R 21/26* | (2011.01) |

(52) U.S. Cl.
CPC ........ *B60R 21/213* (2013.01); *B60R 21/2338* (2013.01); *B60R 21/23138* (2013.01); *B60R 21/26* (2013.01); *B60R 2021/23107* (2013.01)

(58) Field of Classification Search
CPC . B60R 21/213; B60R 21/214; B60R 21/2338; B60R 21/23138; B60R 21/26; B60R 2021/23107; B60R 2021/23386; B60R 21/231; B60R 2021/23192; B60R 2021/161
See application file for complete search history.

(56) References Cited

U.S. PATENT DOCUMENTS

| | | | | |
|---|---|---|---|---|
| 8,511,735 | B2* | 8/2013 | Lee | B60J 7/0573 296/97.4 |
| 10,471,927 | B1* | 11/2019 | Gupta | B60R 21/36 |
| 2003/0011175 | A1* | 1/2003 | Hess | B60R 21/2338 280/730.2 |
| 2004/0056457 | A1* | 3/2004 | Bossecker | B60R 21/2338 280/730.2 |
| 2006/0033314 | A1* | 2/2006 | Karlbauer | B60R 21/232 280/730.2 |
| 2015/0360637 | A1* | 12/2015 | Sitko | B60R 21/213 280/730.2 |
| 2017/0267199 | A1* | 9/2017 | Schutt | B60R 21/13 |
| 2019/0143928 | A1* | 5/2019 | Raikar | B60R 21/214 280/730.1 |

* cited by examiner

*Primary Examiner* — Karen Beck
(74) *Attorney, Agent, or Firm* — H.C. Park & Associates, PLC (57) ABSTRACT

A roof airbag apparatus including: a first cushion disposed on one side of a panoramic sunroof in a width direction of the panoramic sunroof and connected to an inflator; a second cushion disposed on the other side of the panoramic sunroof in the width direction and connected to the inflator; a first wire connected to the second cushion and connected to the first cushion to pull the second cushion toward the first cushion when the first cushion is deployed; a second wire connected to the first cushion and connected to the second cushion to pull the first cushion toward the second cushion when the second cushion is deployed; and guide anchors on which the first wire and the second wire are movably supported.

14 Claims, 6 Drawing Sheets

ROOF AIRBAG APPARATUS

CROSS-REFERENCE TO RELATED APPLICATION

This application claims priority from and the benefit of Korean Patent Application No. 10-2018-0135691, filed on Nov. 7, 2018, which is hereby incorporated by reference for all purposes as if set forth herein.

BACKGROUND

Field

Exemplary embodiments relates to a roof airbag apparatus, and more particularly, to a roof airbag apparatus in which a pair of cushions can be smoothly deployed because one of the cushions is deployed by a deployment pressure of the other cushion.

Discussion of the Background

An airbag apparatus is generally installed in a vehicle for safety of an occupant. A roof airbag apparatus is installed on a rear side of a panoramic roof installed in a ceiling of the vehicle. Guide bars are installed on opposite sides of the roof airbag apparatus in a width direction so as to guide wires. When the roof airbag apparatus is deployed, the roof airbag apparatus is deployed along the guides while the roof airbag apparatus is inflated. The roof airbag apparatus prevents injury to or outward ejection of a driver and an occupant in the event of a rollover of the vehicle.

However, in the related art, since a gas pressure is abruptly raised in the initial stage of explosion of an inflator of the roof airbag apparatus in the event of the rollover of the vehicle, a frictional force between the roof airbag apparatus and the guide bars is increased. Due to an increase in the frictional force between the roof airbag apparatus and the guide bars, incomplete deployment of the roof airbag apparatus can occur. Due to the incomplete deployment of the roof airbag apparatus, injury and ejection possibilities of the occupant can be raised.

The above information disclosed in this Background section is only for enhancement of understanding of the background of the invention and, therefore, it may contain information that does not constitute prior art.

SUMMARY

Various embodiments have been made in view of the above problems, and are directed to a roof airbag apparatus in which a pair of cushions can be smoothly deployed because one of the cushions is deployed by a deployment pressure of the other cushion.

In a first embodiment, a roof airbag apparatus includes: a first cushion disposed on one side of a panoramic sunroof in a width direction of the panoramic sunroof and connected to an inflator; a second cushion disposed on the other side of the panoramic sunroof in the width direction and connected to the inflator; a first wire connected to the second cushion and connected to the first cushion to pull the second cushion toward the first cushion when the first cushion is deployed; a second wire connected to the first cushion and connected to the second cushion to pull the first cushion toward the second cushion when the second cushion is deployed; and guide anchors on which the first wire and the second wire are movably supported.

In the first embodiment, the first wire may include a first cross wire that is installed to be parallel to a second free end of the second cushion, and first side wires that extend from opposite ends of the first cross wire toward the first cushion, are coupled to a first free end of the first cushion, and are movably supported on the guide anchors.

In the first embodiment, the second wire may include a second cross wire that is installed to be parallel to the first free end of the first cushion, and second side wires that extend from opposite ends of the second cross wire toward the second cushion, are coupled to the second free end of the second cushion, and are movably supported on the guide anchors.

In the first embodiment, the guide anchors may be disposed on front and rear sides of the panoramic sunroof.

In the first embodiment, the first cushion and the second cushion may be formed to have the same deployed length, and each of the guide anchors may be disposed in the middle of the panoramic sunroof in the width direction.

In the first embodiment, the roof airbag apparatus may further include: first guides on which the first side wires of the first wire are movably supported; and second guides on which the second side wires of the second wire are movably supported.

In the first embodiment, the inflator may include a first inflator that is connected to the first cushion, and a second inflator that is connected to the second cushion.

In a second embodiment, a roof airbag apparatus includes: a first cushion disposed on a front side of a panoramic sunroof and connected to an inflator; a second cushion disposed on a rear side of the panoramic sunroof and connected to the inflator; a first wire connected to the second cushion and connected to the first cushion to pull the second cushion toward the first cushion when the first cushion is deployed; a second wire connected to the first cushion and connected to the second cushion to pull the first cushion toward the second cushion when the second cushion is deployed; and guide anchors on which the first wire and the second wire are movably supported.

In the second embodiment, the first wire may include a first cross wire that is installed to be parallel to a second free end of the second cushion, and first side wires that extend from opposite ends of the first cross wire toward the first cushion, are coupled to a first free end of the first cushion, and are movably supported on the guide anchors.

In the second embodiment, the second wire may include a second cross wire that is installed to be parallel to the first free end of the first cushion, and second side wires that extend from opposite ends of the second cross wire toward the second cushion, are coupled to the second free end of the second cushion, and are movably supported on the guide anchors.

In the second embodiment, the guide anchors may be disposed on opposite sides of the panoramic sunroof in a width direction of the panoramic sunroof.

In the second embodiment, the first cushion and the second cushion may be formed to have the same deployed length, and each of the guide anchors may be disposed in the middle of the panoramic sunroof in a forward/backward direction of the panoramic sunroof.

In the second embodiment, the roof airbag apparatus may further include: first guides on which the first side wires of the first wire are movably supported; and second guides on which the second side wires of the second wire are movably supported.

In the second embodiment, the inflator may include a first inflator that is connected to the first cushion, and a second inflator that is connected to the second cushion.

According to the present disclosure, the first wire pulls the second cushion toward the first cushion when the first cushion is deployed, and the second wire pulls the first cushion toward the second cushion when the second cushion is deployed. In this case, the first cushion is deployed by a pressure of a gas injected into the first cushion and a tensile force of the second wire, and the second cushion is deployed by a pressure of a gas injected into the second cushion and a tensile force of the first wire. Therefore, the first cushion and the second cushion can be smoothly deployed.

Further, according to the present disclosure, since the first cushion and the second cushion each are deployed to almost half cover the panoramic sunroof, deployed lengths of the first and second cushions can be reduced. Therefore, a possibility of incomplete deployment of the first and second cushions can be remarkably reduced.

Further, according to the present disclosure, since the guide anchors prevent the first and second wires from being untied, and the first and second cushions are tightly pulled by the first and second wires, the incomplete deployment of the first and second cushions can be prevented.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Hereinafter, a roof airbag apparatus will be described below with reference to the accompanying drawings through various examples of embodiments. In the drawings, thicknesses of certain lines, sizes of components, etc. may be exaggerated for clarity and convenience of description. Further, technical terms, as will be mentioned below, are terms defined in consideration of functions thereof in the present disclosure, which may be varied according to the intention of a user, practice, or the like. Therefore, the terms should be defined on the basis of the contents of this specification.

First, a roof airbag apparatus according to a first embodiment of the present disclosure will be described.

Figure 1:
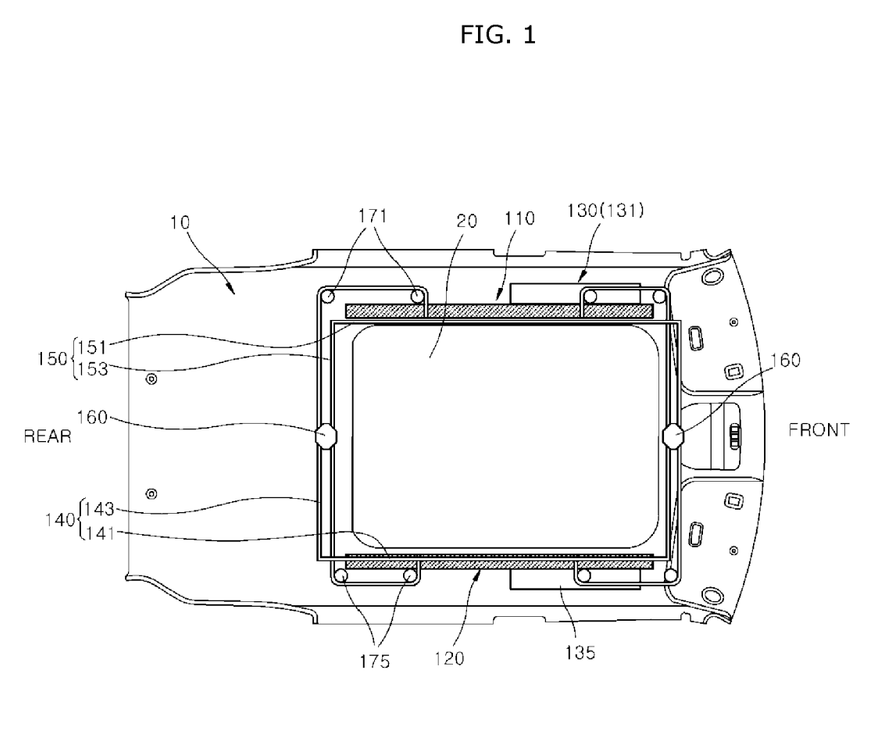
FIG. 1 is a top view illustrating a roof airbag apparatus according to a first embodiment of the present disclosure.
Figure 2:
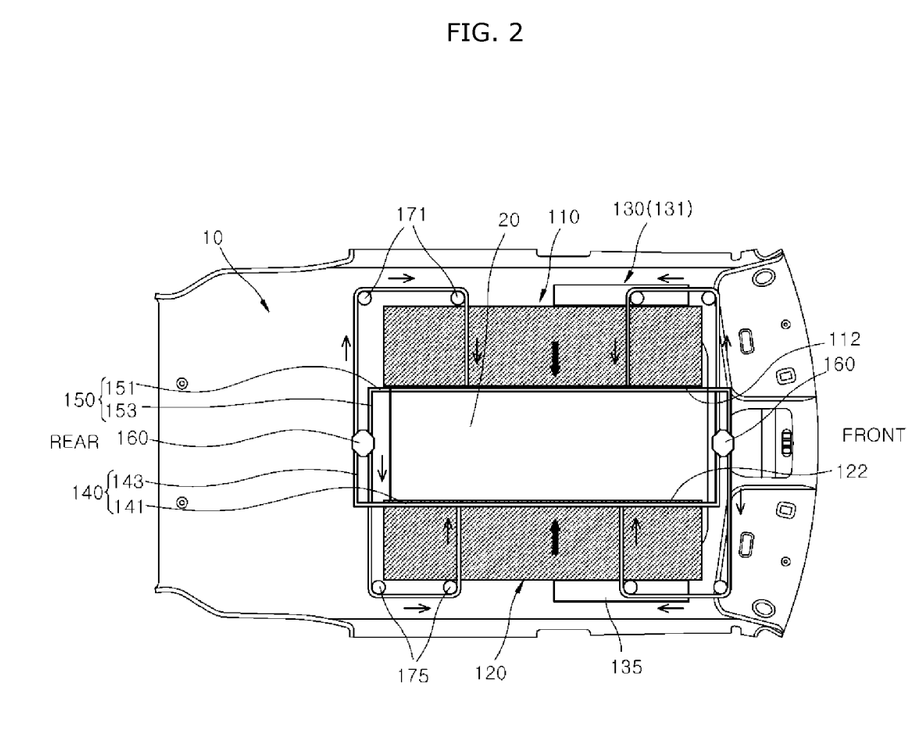
FIG. 2 is a top view illustrating a state in which a first cushion and a second cushion are almost half deployed in the roof airbag apparatus according to the first embodiment of the present disclosure.
Figure 3:
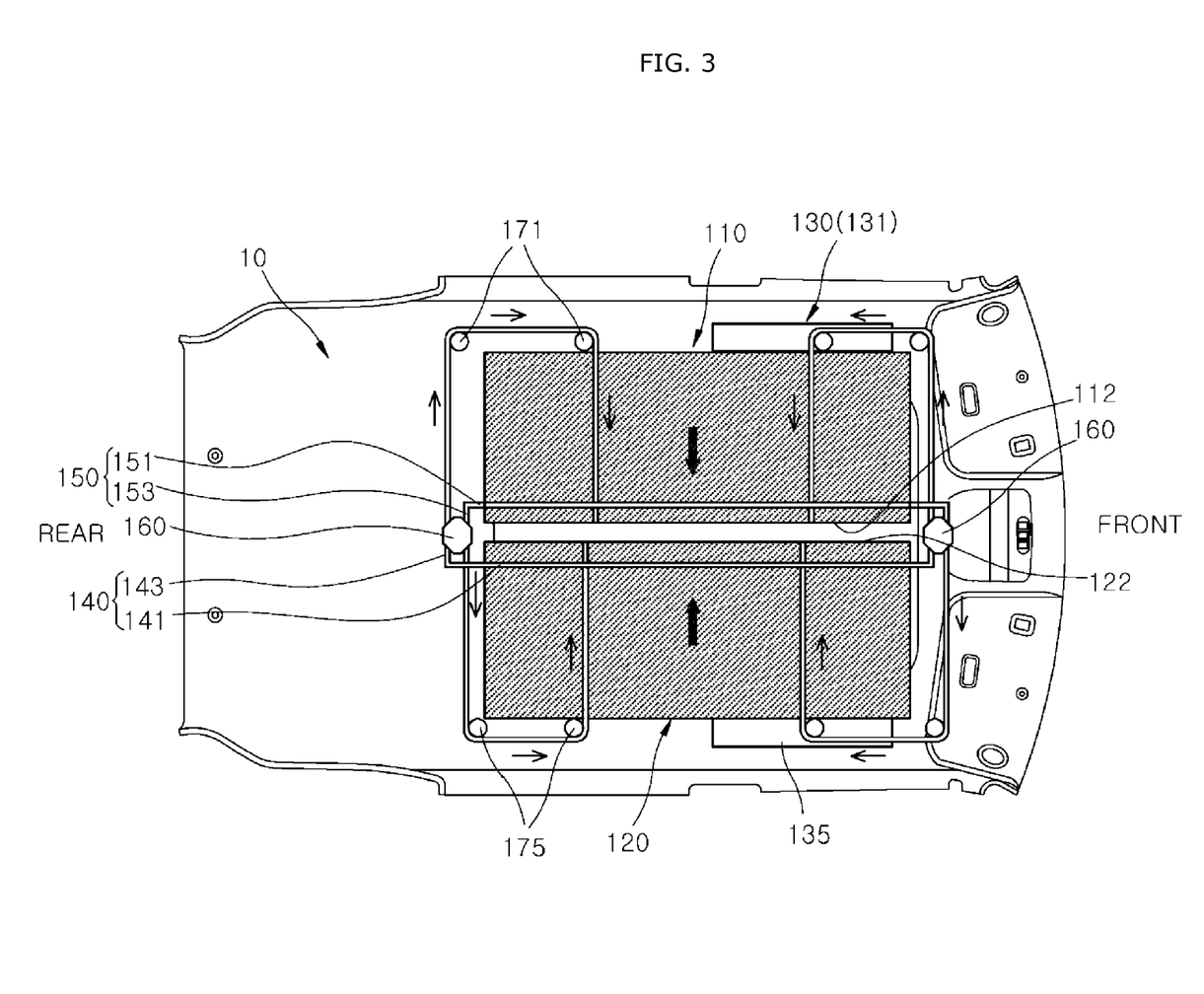
FIG. 3 is a top view illustrating a state in which the first cushion and the second cushion are fully deployed in the roof airbag apparatus according to the first embodiment of the present disclosure.

FIG. 1 is a top view illustrating a roof airbag apparatus according to a first embodiment of the present disclosure. FIG. 2 is a top view illustrating a state in which a first cushion and a second cushion are almost half deployed in the roof airbag apparatus according to the first embodiment of the present disclosure. FIG. 3 is a top view illustrating a state in which the first cushion and the second cushion are fully deployed in the roof airbag apparatus according to the first embodiment of the present disclosure.

Referring to FIGS. 1 to 3, a roof airbag apparatus according to a first embodiment of the present disclosure includes a first cushion 110, a second cushion 120, a first wire 140, a second wire 150, and guide anchors 160.

A head lining 10 is installed on a ceiling of a vehicle body, and an opening (not illustrated) is formed in the center of the head lining 10. A panoramic sunroof 20 is installed in the opening of the head lining 10.

The first cushion 110 is disposed on one side of the panoramic sunroof 20 in a width direction, and is connected to an inflator 130. The first cushion 110 is installed on one side of the panoramic sunroof 20 in the width direction in a folded state.

The second cushion 120 is disposed on the other side of the panoramic sunroof 20 in the width direction, and is connected to the inflator 130. The second cushion 120 is installed on the other side of the panoramic sunroof 20 in the width direction in a folded state.

The first wire 140 is connected to the second cushion 120, and is connected to the first cushion 110 to pull the second cushion 120 toward the first cushion 110 when the first cushion 110 is deployed.

The second wire 150 is connected to the first cushion 110, and is connected to the second cushion 120 to pull the first cushion 110 toward the second cushion 120 when the second cushion 120 is deployed.

The first wire 140 pulls the second cushion 120 toward the first cushion 110 when the first cushion 110 is deployed, and the second wire 150 pulls the first cushion 110 toward the second cushion 120 when the second cushion 120 is deployed. In this case, the first cushion 110 is deployed by a pressure of a gas injected into the first cushion 110 and a tensile force of the second wire 150, and the second cushion 120 is deployed by a pressure of a gas injected into the second cushion 120 and a tensile force of the first wire 140. Therefore, since inflation pressures of the gases and the tensile forces of the wires 140 and 150 are simultaneously applied to the corresponding cushions 110 and 120, the first cushion 110 and the second cushion 120 can be easily deployed. Further, the first wire 140 is pulled by an inflation force of the first cushion 110, and the second wire 150 is pulled by an inflation force of the second cushion 120. Thus, the first cushion 110 and the second cushion 120 can be prevented from being caught by a surrounding structure or from being incompletely deployed by frictional forces against the wires 140 and 150.

Further, since the first cushion 110 and the second cushion 120 each are deployed to almost half cover the panoramic sunroof 20, deployed lengths of the first and second cushions 110 and 120 can be reduced. Therefore, a possibility of the incomplete deployment of the first and second cushions 110 and 120 can be remarkably reduced.

The guide anchors 160 movably support the first and second wires 140 and 150. Therefore, since the guide anchors 160 prevent the first and second wires 140 and 150 from being untied or loosened, the first and second cushions 110 and 120 are tightly pulled by the first and second wires 140 and 150. Furthermore, the incomplete deployment of the first and second cushions 110 and 120 can be prevented.

The first wire 140 includes a first cross wire 141 and first side wires 143.

The first cross wire 141 is installed to be parallel to a second free end 122 of the second cushion 120. The first cross wire 141 is disposed in parallel in a forward/backward direction of the vehicle. The first cross wire 141 can be immovably fixed to the second free end 122. The second free end 122 is an end that is deployed in the second cushion 120 toward the middle of the panoramic sunroof 20 in the width direction.

The first side wires 143 extend from opposite ends of the first cross wire 141 toward the first cushion 110, are connected to a first free end 112 of the first cushion 110, and are movably supported on the guide anchors 160.

The first cross wire 141 is linearly formed along the second free end 122 of the second cushion 120, and the first side wires 143 are disposed around the first cushion 110. Ends of the first side wires 143 are connected to the first free end 112 of the first cushion 110.

The second wire 150 includes a second cross wire 151 and second side wires 153.

The second cross wire 151 is installed to be parallel to the first free end 112 of the first cushion 110. The second cross wire 151 is disposed in parallel in the forward/backward direction of the vehicle. The second cross wire 151 can be immovably fixed to the first free end 112. The first free end 112 is an end that is deployed in the first cushion 110 toward the middle of the panoramic sunroof 20 in the width direction.

The second side wires 153 extend from opposite ends of the second cross wire 151 toward the second cushion 120, are connected to the second free end 122 of the second cushion 120, and are movably supported on the guide anchors 160.

The second cross wire 151 is linearly formed along the first free end 112 of the first cushion 110, and the second side wires 153 are disposed around the second cushion 120. Ends of the second side wires 153 are connected to the second free end 122 of the second cushion 120.

The first side wires 143 are formed in a "¬" shape to surround the front and rear sides of the panoramic sunroof 20 and parts of one side of the panoramic sunroof 20 in the width direction before the first cushion 110 is deployed. Further, the first side wires 143 are formed in a "⊏" shape to surround the front and rear sides of the panoramic sunroof 20 and parts of one side of the panoramic sunroof 20 in the width direction when the first cushion 110 is fully deployed. Further, the first cross wire 141 is always disposed in parallel in the forward/backward direction of the vehicle regardless of before and after the first cushion 110 is deployed.

The second side wires 153 are formed in a "¬" shape to surround the front and rear sides of the panoramic sunroof 20 and parts of the other side of the panoramic sunroof 20 in the width direction before the second cushion 120 is deployed. Further, the second side wires 153 are formed in a "⊏" shape to surround the front and rear sides of the panoramic sunroof 20 and parts of the other side of the panoramic sunroof 20 in the width direction when the second cushion 120 is fully deployed. Further, the second cross wire 151 is always disposed in parallel in the forward/ backward direction of the vehicle regardless of before and after the second cushion 120 is deployed.

The guide anchors 160 are disposed on the front and rear sides of the panoramic sunroof 20, respectively. A pair of through-holes (not illustrated) can be formed in each of the guide anchors 160 such that each of the first side wires 143 and each of the second side wires 153 can pass therethrough.

The first cushion 110 and the second cushion 120 are formed to have the same deployed length, and each of the guide anchors 160 is disposed in the middle of the panoramic sunroof 20 in the width direction. Since the first cushion 110 and the second cushion 120 are formed to have the same deployed length, the first free end 112 of the first cushion 110 and the second free end 122 of the second cushion 120 are disposed in the middle of the panoramic sunroof 20 in the width direction when the first cushion 110 and the second cushion 120 are deployed.

The roof airbag apparatus further includes first guides 171 on which the first side wires 143 of the first wire 140 are movably supported, and second guides 175 on which the second side wires 153 of the second wire 150 are movably supported. Since the first guides 171 and the second guides 175 movably support the first side wires 143 and the second side wires 153, the first wire 140 and the second wire 150 can tightly maintain tensile forces when the first cushion 110 and the second cushion 120 are deployed.

The first guides 171 may include a plurality of first guide rollers (not illustrated) that support the first side wires 143. The second guides 175 may include a plurality of second guide rollers (not illustrated) that support the second side wires 153.

The inflator 130 includes a first inflator 131 connected to the first cushion 110, and a second inflator 135 connected to the second cushion 120. The first inflator 131 supplies a gas to the first cushion 110, and the second inflator 135 supplies a gas to the second cushion 120. As the first inflator 131 and the second inflator 135 are simultaneously driven, the first cushion 110 and the second cushion 120 are simultaneously deployed.

Further, the first and second inflators may be one inflator that simultaneously injects a gas into the first cushion 110 and the second cushion 120.

A deploying process of the roof airbag apparatus, configured as above, according to the first embodiment of the present disclosure will be described.

In the event of a rollover of the vehicle, the first inflator 131 and the second inflator 135 are simultaneously driven. As the first inflator 131 and the second inflator 135 supply gases to the first cushion 110 and the second cushion 120, the first cushion 110 and the second cushion 120 are simultaneously deployed.

In this case, when the first cushion 110 is deployed, as the first side wires 143 of the first wire 140 pull the first cross wire 141 toward the first cushion 110, and the first cross wire 141 is pulled toward the first cushion 110, the second free end 122 of the second cushion 120 is deployed toward the middle of the panoramic sunroof 20 in the width direction. Simultaneously, when the second cushion 120 is deployed, as the second side wires 153 of the second wire 150 pull the second cross wire 151 toward the second cushion 120, and the second cross wire 151 is pulled toward the second cushion 120, the first free end 112 of the first cushion 110 is deployed toward the middle of the panoramic sunroof 20 in the width direction. Therefore, since the first cushion 110 is deployed by a tensile force of the second cross wire 151 and an inflation pressure of the first cushion 110, and the second cushion 120 is deployed by a tensile force of the first cross wire 141 and an inflation pressure of the second cushion 120, the first cushion 110 and the second cushion 120 can be smoothly deployed.

Further, since the first and second wires 140 and 150 are kept tight by the first and second guides 171 and 175 when the first cushion 110 and the second cushion 120 are deployed, the first cushion 110 and the second cushion 120 can be deployed in a tightly pulled state. Therefore, the first cushion 110 and the second cushion 120 can be prevented from being twisted or changed in a deployment direction when the first cushion 110 and the second cushion 120 are deployed. Furthermore, since the incomplete deployment of the first cushion 110 and the second cushion 120 can be prevented, injury and ejection possibilities of an occupant in the event of the rollover of the vehicle can be reduced.

Next, a roof airbag apparatus according to a second embodiment of the present disclosure will be described.

Figure 4:
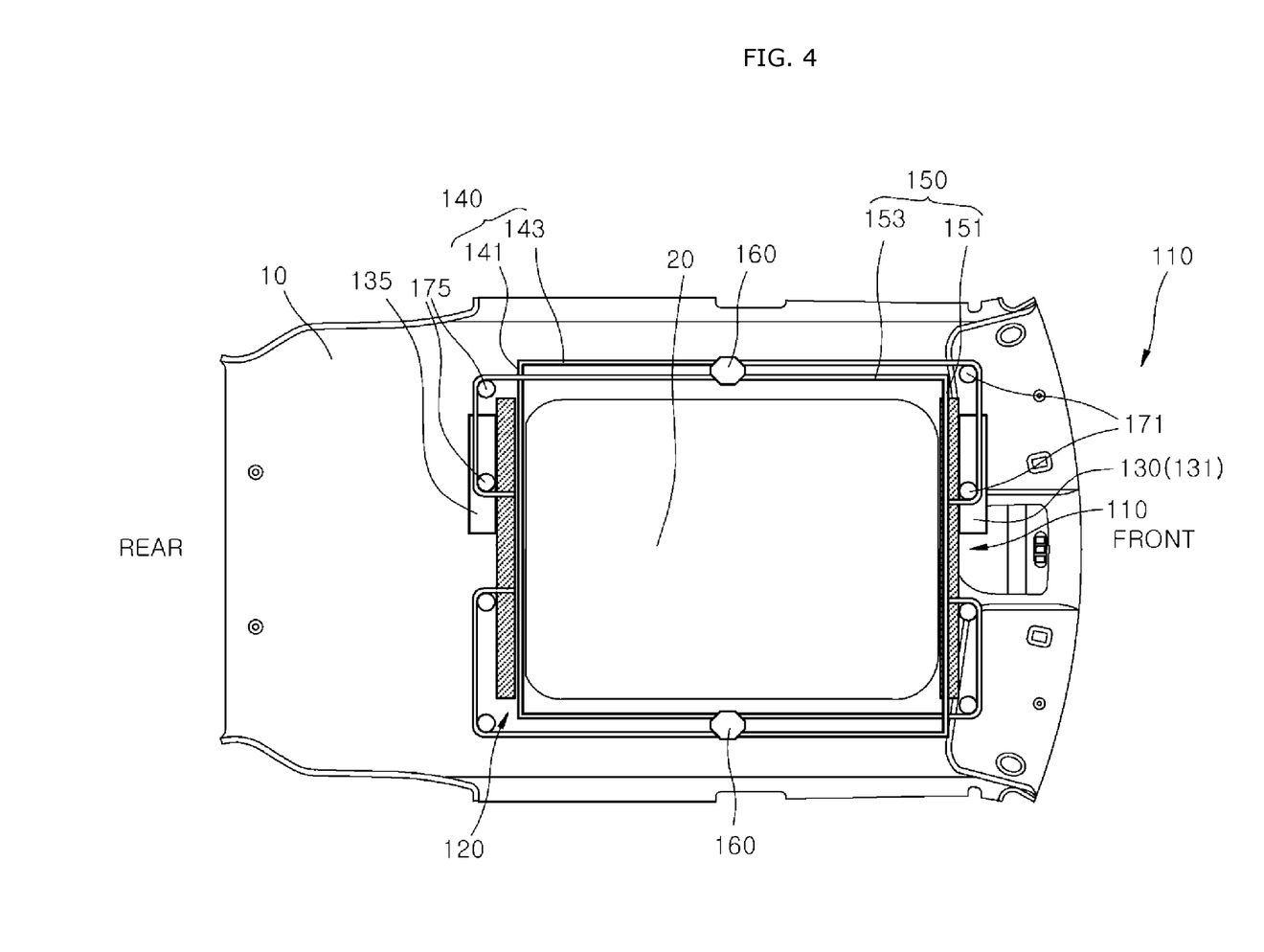
FIG. 4 is a top view illustrating a roof airbag apparatus according to a second embodiment of the present disclosure.
Figure 5:
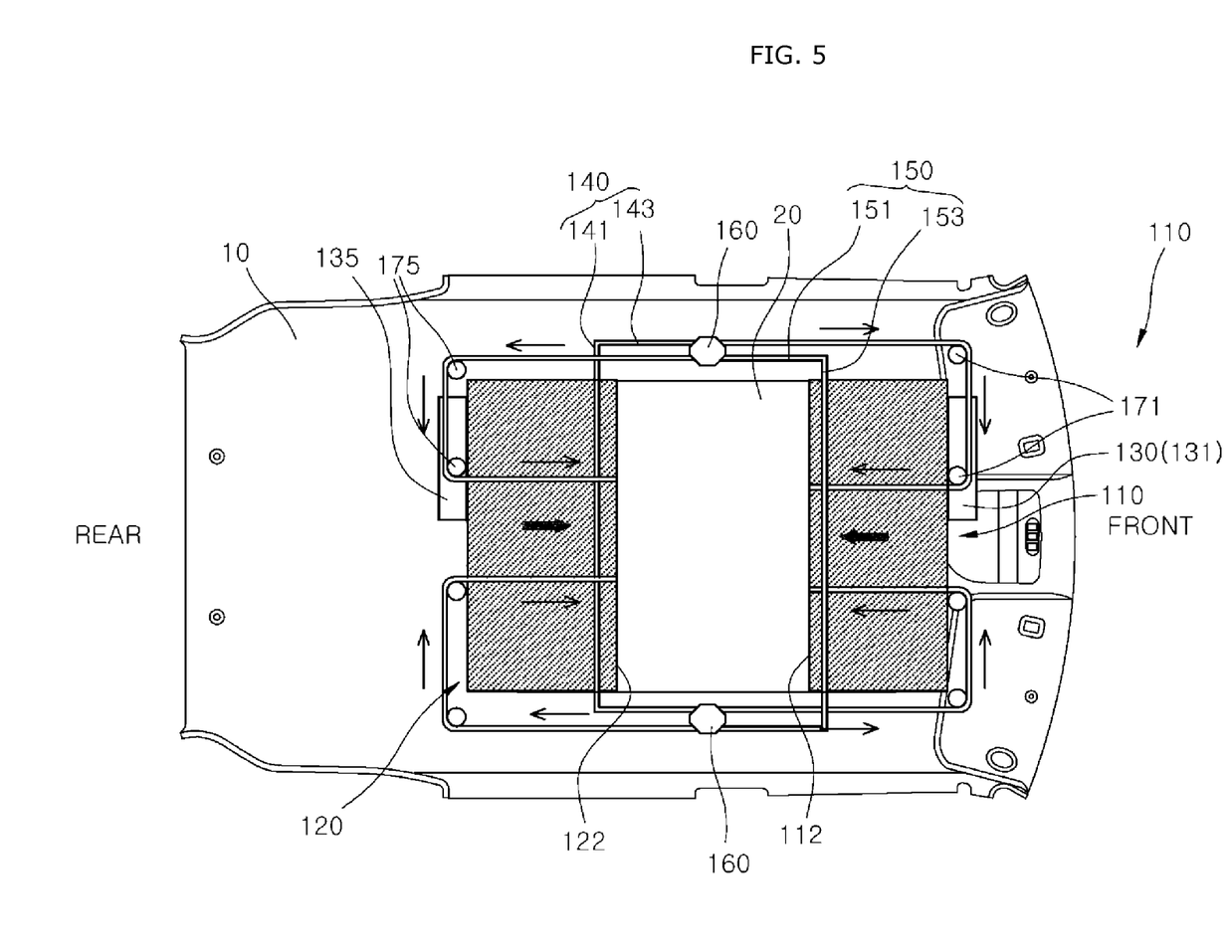
FIG. 5 is a top view illustrating a state in which a first cushion and a second cushion are almost half deployed in the roof airbag apparatus according to the second embodiment of the present disclosure.
Figure 6:
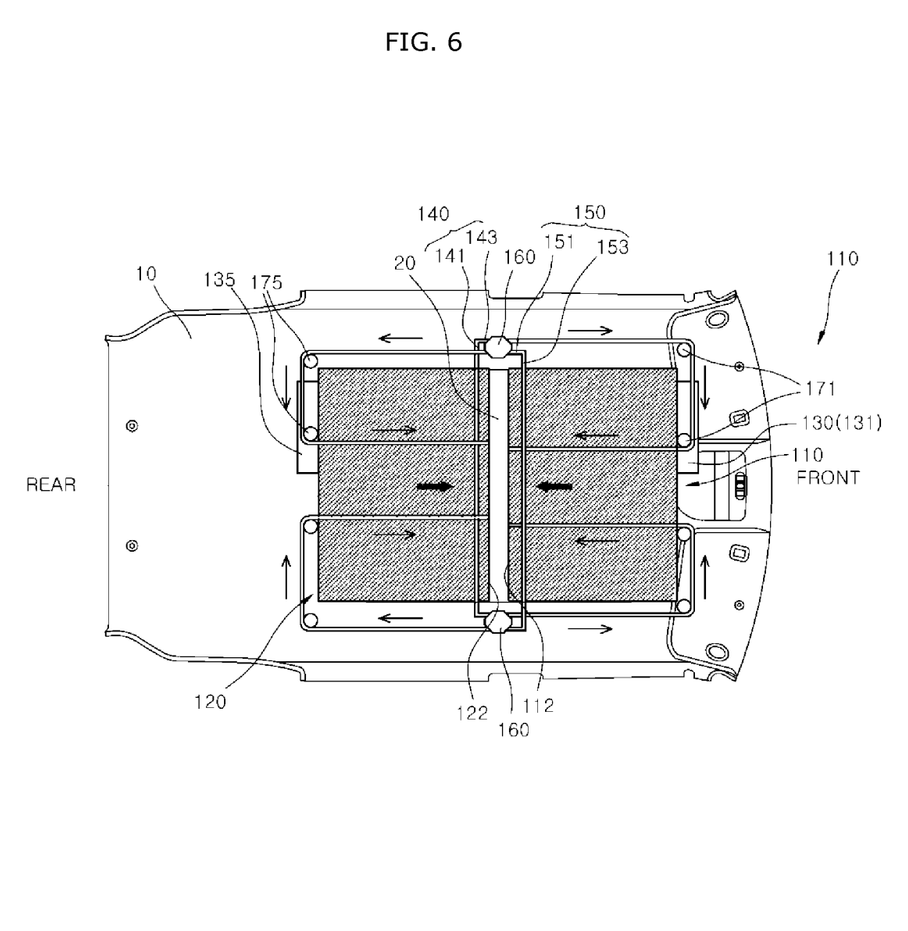
FIG. 6 is a top view illustrating a state in which the first cushion and the second cushion are fully deployed in the roof airbag apparatus according to the second embodiment of the present disclosure.

FIG. 4 is a top view illustrating a roof airbag apparatus according to a second embodiment of the present disclosure. FIG. 5 is a top view illustrating a state in which a first cushion and a second cushion are almost half deployed in the roof airbag apparatus according to the second embodiment of the present disclosure. FIG. 6 is a top view illustrating a state in which the first cushion and the second cushion are fully deployed in the roof airbag apparatus according to the second embodiment of the present disclosure.

Referring to FIGS. 4 to 6, a roof airbag apparatus according to a second embodiment of the present disclosure includes a first cushion 110, a second cushion 120, a first wire 140, a second wire 150, and guide anchors 160.

A head lining 10 is installed on a ceiling of a vehicle body, and an opening (not illustrated) is formed in the center of the head lining 10. A panoramic sunroof 20 is installed in the opening of the head lining 10.

The first cushion 110 is disposed on a front side of the panoramic sunroof 20, and is connected to an inflator 130. The first cushion 110 is installed on the front side of the panoramic sunroof 20 in a folded state.

The second cushion 120 is disposed on a rear side of the panoramic sunroof 20, and is connected to the inflator 130. The second cushion 120 is installed on the rear side of the panoramic sunroof 20 in a folded state.

The first wire 140 is connected to the second cushion 120, and is connected to the first cushion 110 to pull the second cushion 120 toward the first cushion 110 when the first cushion 110 is deployed.

The second wire 150 is connected to the first cushion 110, and is connected to the second cushion 120 to pull the first cushion 110 toward the second cushion 120 when the second cushion 120 is deployed.

The first wire 140 pulls the second cushion 120 toward the first cushion 110 when the first cushion 110 is deployed, and the second wire 150 pulls the first cushion 110 toward the second cushion 120 when the second cushion 120 is deployed. In this case, the first cushion 110 is deployed by a pressure of a gas injected into the first cushion 110 and a tensile force of the second wire 150, and the second cushion 120 is deployed by a pressure of a gas injected into the second cushion 120 and a tensile force of the first wire 140. Therefore, since inflation pressures of the gases and the tensile forces of the wires 140 and 150 are simultaneously applied to the corresponding cushions 110 and 120, the first cushion 110 and the second cushion 120 can be smoothly deployed. Further, the first wire 140 is pulled by an inflation force of the second cushion 120, and the second wire 150 is pulled by an inflation force of the first cushion 110. Thus, the first cushion 110 and the second cushion 120 can be prevented from being caught by a surrounding structure or from being incompletely deployed by frictional forces against the wires 140 and 150.

Further, since the first cushion 110 and the second cushion 120 each are deployed to almost half cover the panoramic sunroof 20, deployed lengths of the first and second cushions 110 and 120 can be reduced. Therefore, a possibility of the incomplete deployment of the first and second cushions 110 and 120 can be remarkably reduced.

The guide anchors 160 movably support the first and second wires 140 and 150. Therefore, since the guide anchors 160 prevent the first and second wires 140 and 150 from being untied or loosened, the first and second cushions 110 and 120 can be tightly pulled by the first and second wires 140 and 150. Furthermore, the incomplete deployment of the first and second cushions 110 and 120 can be prevented.

The first wire 140 includes a first cross wire 141 and first side wires 143.

The first cross wire 141 is installed to be parallel to a second free end 122 of the second cushion 120. The first cross wire 141 is disposed in parallel in a width direction of the vehicle. The first cross wire 141 can be immovably fixed to the second free end 122. The second free end 122 is an end that is deployed in the second cushion 120 toward the middle of the panoramic sunroof 20 in a forward/backward direction.

The first side wires 143 extend from opposite ends of the first cross wire 141 toward the first cushion 110, are connected to a first free end 112 of the first cushion 110, and are movably supported on the guide anchors 160.

The first cross wire 141 is linearly formed along the second free end 122 of the second cushion 120, and the first side wires 143 are disposed around the first cushion 110. Ends of the first side wires 143 are connected to the first free end 112 of the first cushion 110.

The second wire 150 includes a second cross wire 151 and second side wires 153.

The second cross wire 151 is installed to be parallel to the first free end 112 of the first cushion 110. The second cross wire 151 is disposed in parallel in the width direction of the vehicle. The second cross wire 151 can be immovably fixed to the first free end 112. The first free end 112 is an end that is deployed in the first cushion 110 toward the middle of the panoramic sunroof 20 in the forward/backward direction.

The second side wires 153 extend from opposite ends of the second cross wire 151 toward the second cushion 120, are connected to the second free end 122 of the second cushion 120, and are movably supported on the guide anchors 160.

The second cross wire 151 is linearly formed along the first free end 112 of the first cushion 110, and the second side wires 153 are disposed around the second cushion 120. Ends of the second side wires 153 are connected to the second free end 122 of the second cushion 120.

The first side wires 143 are formed in a "¬" shape to surround parts of a front side of the panoramic sunroof 20 and opposite sides of the panoramic sunroof 20 in the width direction before the first cushion 110 is deployed. Further, the first side wires 143 are formed in a "⊏" shape to surround parts of a front side of the panoramic sunroof 20 and opposite sides of the panoramic sunroof 20 in the width direction when the first cushion 110 is fully deployed. Further, the first cross wire 141 is always disposed in parallel in the width direction of the vehicle regardless of before and after the first cushion 110 is deployed.

The second side wires 153 are formed in a "L" shape to surround parts of a rear side of the panoramic sunroof 20 and the opposite sides of the panoramic sunroof 20 in the width direction before the second cushion 120 is deployed. Further, the second side wires 153 are formed in a "⊏" shape to surround parts of a rear side of the panoramic sunroof 20 and the opposite sides of the panoramic sunroof 20 in the width direction when the second cushion 120 is fully deployed. Further, the second cross wire 151 is always disposed in parallel in the width direction of the vehicle regardless of before and after the second cushion 120 is deployed.

The guide anchors 160 are disposed on the opposite sides of the panoramic sunroof 20 in the width direction, respectively. A pair of through-holes (not illustrated) can be formed in each of the guide anchors 160 such that each of the first side wires 143 and each of the second side wires 153 can pass therethrough.

The first cushion 110 and the second cushion 120 are formed to have the same deployed length, and each of the guide anchors 160 is disposed in the middle of the panoramic sunroof 20 in the forward/backward direction. Since the first cushion 110 and the second cushion 120 are formed to have the same deployed length, the first free end 112 of the first cushion 110 and the second free end 122 of the second cushion 120 are disposed in the middle of the panoramic sunroof 20 in the forward/backward direction when the first cushion 110 and the second cushion 120 are deployed.

The roof airbag apparatus further includes first guides 171 on which the first side wires 143 of the first wire 140 are movably supported, and second guides 175 on which the second side wires 153 of the second wire 150 are movably supported. Since the first guides 171 and the second guides 175 movably support the first side wires 143 and the second side wires 153, the first wire 140 and the second wire 150 can tightly maintain tensile forces when the first cushion 110 and the second cushion 120 are deployed.

The first guides 171 may include a plurality of first guide rollers (not illustrated) that support the first side wires 143. The second guides 175 may include a plurality of second guide rollers (not illustrated) that support the second side wires 153.

The inflator 130 includes a first inflator 131 connected to the first cushion 110, and a second inflator 135 connected to the second cushion 120. The first inflator 131 supplies a gas to the first cushion 110, and the second inflator 135 supplies a gas to the second cushion 120. As the first inflator 131 and the second inflator 135 are simultaneously driven, the first cushion 110 and the second cushion 120 are simultaneously deployed.

Further, the first and second inflators may be one inflator that simultaneously injects a gas into the first cushion 110 and the second cushion 120.

A deploying process of the roof airbag apparatus, configured as above, according to the second embodiment of the present disclosure will be described.

In the event of a rollover of the vehicle, the first inflator 131 and the second inflator 135 are simultaneously driven. As the first inflator 131 and the second inflator 135 supply gases to the first cushion 110 and the second cushion 120, the first cushion 110 and the second cushion 120 are simultaneously deployed.

In this case, when the first cushion 110 is deployed, as the first side wires 143 of the first wire 140 pull the first cross wire 141 toward the first cushion 110, and the first cross wire 141 is pulled toward the first cushion 110, the second free end 122 of the second cushion 120 is deployed toward the middle of the panoramic sunroof 20 in the forward/backward direction. Simultaneously, when the second cushion 120 is deployed, as the second side wires 153 of the second wire 150 pull the second cross wire 151 toward the second cushion 120, and the second cross wire 151 is pulled toward the second cushion 120, the first free end 112 of the first cushion 110 is deployed toward the middle of the panoramic sunroof 20 in the forward/backward direction. Therefore, since the first cushion 110 is deployed by a tensile force of the second cross wire 151 and an inflation pressure of the first cushion 110, and the second cushion 120 is deployed by a tensile force of the first cross wire 141 and an inflation pressure of the second cushion 120, the first cushion 110 and the second cushion 120 can be smoothly deployed.

Further, since the first and second wires 140 and 150 are kept tight by the first and second guides 171 and 175 when the first cushion 110 and the second cushion 120 are deployed, the first cushion 110 and the second cushion 120 can be deployed in a tightly pulled state. Therefore, the first cushion 110 and the second cushion 120 can be prevented from being twisted or changed in a deployment direction when the first cushion 110 and the second cushion 120 are deployed. Furthermore, since the incomplete deployment of the first cushion 110 and the second cushion 120 can be prevented, injury and ejection possibilities of an occupant in the event of the rollover of the vehicle can be reduced.

Although preferred embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. A roof airbag apparatus comprising:
   a first cushion disposed on one side of a panoramic sunroof in a width direction of the panoramic sunroof and connected to an inflator;
   a second cushion disposed on the other side of the panoramic sunroof in the width direction and connected to the inflator;
   a first wire connected to the second cushion and connected to the first cushion to pull the second cushion toward the first cushion when the first cushion is deployed;
   a second wire connected to the first cushion and connected to the second cushion to pull the first cushion toward the second cushion when the second cushion is deployed; and
   guide anchors on which the first wire and the second wire are movably supported.

2. The roof airbag apparatus according to claim 1, wherein the first wire includes:
   a first cross wire that is installed to be parallel to a second free end of the second cushion; and
   first side wires that extend from opposite ends of the first cross wire toward the first cushion, are coupled to a first free end of the first cushion, and are movably supported on the guide anchors.

3. The roof airbag apparatus according to claim 2, wherein the second wire includes:
   a second cross wire that is installed to be parallel to the first free end of the first cushion; and
   second side wires that extend from opposite ends of the second cross wire toward the second cushion, are coupled to the second free end of the second cushion, and are movably supported on the guide anchors.

4. The roof airbag apparatus according to claim 3, wherein the guide anchors are disposed on front and rear sides of the panoramic sunroof.

5. The roof airbag apparatus according to claim 4, wherein:
the first cushion and the second cushion are formed to have the same deployed length; and
each of the guide anchors is disposed in the middle of the panoramic sunroof in the width direction.

6. The roof airbag apparatus according to claim 3, further comprising:
first guides on which the first side wires of the first wire are movably supported; and
second guides on which the second side wires of the second wire are movably supported.

7. The roof airbag apparatus according to claim 1, wherein the inflator includes:
a first inflator that is connected to the first cushion; and
a second inflator that is connected to the second cushion.

8. A roof airbag apparatus comprising:
a first cushion disposed on a front side of a panoramic sunroof and connected to an inflator;
a second cushion disposed on a rear side of the panoramic sunroof and connected to the inflator;
a first wire connected to the second cushion and connected to the first cushion to pull the second cushion toward the first cushion when the first cushion is deployed;
a second wire connected to the first cushion and connected to the second cushion to pull the first cushion toward the second cushion when the second cushion is deployed; and
guide anchors on which the first wire and the second wire are movably supported.

9. The roof airbag apparatus according to claim 8, wherein the first wire includes:
a first cross wire that is installed to be parallel to a second free end of the second cushion; and
first side wires that extend from opposite ends of the first cross wire toward the first cushion, are coupled to a first free end of the first cushion, and are movably supported on the guide anchors.

10. The roof airbag apparatus according to claim 9, wherein the second wire includes:
a second cross wire that is installed to be parallel to the first free end of the first cushion; and
second side wires that extend from opposite ends of the second cross wire toward the second cushion, are coupled to the second free end of the second cushion, and are movably supported on the guide anchors.

11. The roof airbag apparatus according to claim 10, wherein the guide anchors are disposed on opposite sides of the panoramic sunroof in a width direction of the panoramic sunroof.

12. The roof airbag apparatus according to claim 11, wherein:
the first cushion and the second cushion are formed to have the same deployed length; and
each of the guide anchors is disposed in the middle of the panoramic sunroof in a forward/backward direction of the panoramic sunroof.

13. The roof airbag apparatus according to claim 10, further comprising:
first guides on which the first side wires of the first wire are movably supported; and
second guides on which the second side wires of the second wire are movably supported.

14. The roof airbag apparatus according to claim 8, wherein the inflator includes:
a first inflator that is connected to the first cushion; and
a second inflator that is connected to the second cushion.

\* \* \* \* \*